(12) United States Patent
Fant (10) Patent No.: US 10,722,021 B2
(45) Date of Patent: Jul. 28, 2020

(54) FIELD PACK

(71) Applicant: Perry Fant, Mount Pleasant, SC (US)

(72) Inventor: Perry Fant, Mount Pleasant, SC (US)

( * ) Notice: Subject to any disclaimer, the term of this patent is extended or adjusted under 35 U.S.C. 154(b) by 0 days.

(21) Appl. No.: 16/269,880

(22) Filed: Feb. 7, 2019

(65) Prior Publication Data
US 2019/0239627 A1 Aug. 8, 2019

Related U.S. Application Data (60) Provisional application No. 62/627,509, filed on Feb. 7, 2018.

(51) Int. Cl.

| | | |
|---|---|---|
| *A45F 4/02* | (2006.01) |
| *A45F 4/04* | (2006.01) |
| *A01M 31/00* | (2006.01) |
| *E04H 15/02* | (2006.01) |
| *E04H 15/00* | (2006.01) |
| *E04H 15/30* | (2006.01) |
| *A01M 31/02* | (2006.01) |
| *E04H 15/46* | (2006.01) |
| *A41D 1/04* | (2006.01) |
| *A45F 4/12* | (2006.01) |

(52) U.S. Cl.
CPC .............. *A45F 4/04* (2013.01); *A01M 31/025* (2013.01); *E04H 15/001* (2013.01); *E04H 15/30* (2013.01); *E04H 15/46* (2013.01); *A41D 1/04* (2013.01); *A41D 2600/108* (2013.01); *A45F 4/02* (2013.01); *A45F 4/12* (2013.01); *A45F 2004/026* (2013.01); *A45F 2200/05* (2013.01)

(58) Field of Classification Search
CPC ...... A45F 4/02; A45F 4/04; A45F 4/12; A45F 2004/026; A01M 31/025; E04H 15/001; E04H 15/30; A41D 1/04; A41D 2600/108
See application file for complete search history.

(56) References Cited

U.S. PATENT DOCUMENTS

| | | | | |
|---|---|---|---|---|
| 3,590,864 A | * | 7/1971 | Vechesloff | A41D 15/04 135/95 |
| 3,822,813 A | * | 7/1974 | Carter | A45F 4/04 224/154 |
| 3,933,164 A | * | 1/1976 | Ness | A45F 4/06 135/95 |
| 3,990,536 A | * | 11/1976 | Wilburn | A01M 31/02 182/20 |
| 4,236,657 A | * | 12/1980 | Brunton | A45F 3/04 190/111 |

(Continued)

*Primary Examiner* — Justin M Larson (57) ABSTRACT

A field pack having a blind assembly that includes a tract assembly; a blind, preferably a left blind and a right blind, that extends from the field pack and retracts back into the field pack using the tract assembly; a blind cartridge placed within a body of the field pack housing the blind, the blind cartridge comprising a blind wing roll; and a support rod that supports the blind once the blind has been extended into its desired position. The field pack may additionally include a hood assembly to store a hood and allow the hood to be deployed from the field pack. The field pack may additionally include a seat assembly that may include either a pivoting seat or a sliding seat for use with the field pack. Any of the blind, the hood, and the seat may be detachable from the field pack.

20 Claims, 9 Drawing Sheets

(56) References Cited

U.S. PATENT DOCUMENTS

| | | | | |
|---|---|---|---|---|
| 4,418,854 A * | 12/1983 | Genovese | ................ | B62J 11/00 224/154 |
| 5,062,234 A * | 11/1991 | Green | ................ | A01M 31/025 135/901 |
| 5,865,355 A * | 2/1999 | Camara | ................ | A45F 4/02 135/143 |
| 5,937,883 A * | 8/1999 | Camara | ................ | E04H 15/003 135/114 |
| 6,547,110 B2 * | 4/2003 | O'Hare | ................ | A45F 3/08 224/155 |
| 6,779,537 B1 * | 8/2004 | Miller | ................ | A01M 31/00 135/117 |
| 7,051,908 B2 * | 5/2006 | Mignano | ................ | A45F 4/02 224/153 |
| 7,717,309 B1 * | 5/2010 | Lehmberg | ................ | A45F 4/04 135/96 |
| 8,640,721 B2 | 2/2014 | Mulligan | | |
| 8,695,859 B1 * | 4/2014 | Stalker | ................ | A45F 3/04 135/901 |
| 8,727,190 B2 * | 5/2014 | Blair | ................ | A45F 4/02 135/95 |
| 8,752,889 B1 * | 6/2014 | Nievinski | ................ | F41A 23/14 297/184.11 |
| D742,550 S * | 11/2015 | Mitchell | ................ | D25/126 |
| 9,220,344 B2 * | 12/2015 | Birch | ................ | A01M 31/02 |
| 9,426,978 B1 * | 8/2016 | Galloway | ................ | A01M 31/025 |
| 9,615,666 B2 * | 4/2017 | Milich | ................ | A47C 13/00 |
| 9,687,066 B2 | 6/2017 | Redli | | |
| 9,775,425 B2 | 10/2017 | Bruffey | | |
| 9,814,287 B1 * | 11/2017 | Perez Vazquez | ...... | A45B 11/02 |
| 9,918,553 B2 * | 3/2018 | Brune | ................ | E04H 15/001 |
| 10,100,574 B2 * | 10/2018 | Reiner | ................ | E06B 9/18 |
| 10,463,093 B2 * | 11/2019 | Matthews | ................ | A41D 1/04 |
| 2003/0116183 A1 * | 6/2003 | Hill | ................ | A01M 31/02 135/90 |
| 2005/0183758 A1 * | 8/2005 | Corbitt | ................ | A01M 31/025 135/66 |
| 2006/0169729 A1 * | 8/2006 | Reis | ................ | A45F 4/04 224/154 |
| 2007/0012735 A1 * | 1/2007 | Lee | ................ | A45F 3/08 224/155 |
| 2013/0098410 A1 * | 4/2013 | Prasannakumar | ...... | A45B 11/00 135/16 |
| 2015/0296938 A1 * | 10/2015 | Armina del Valle | .. | A45B 11/02 135/161 |
| 2016/0128318 A1 * | 5/2016 | Birch | ................ | A01M 31/02 297/4 |
| 2018/0014529 A1 | 1/2018 | Litwin et al. | | |
| 2018/0042364 A1 * | 2/2018 | Schmitt | ................ | A45F 3/04 |
| 2018/0235352 A1 * | 8/2018 | Jones | ................ | A41D 15/04 |
| 2019/0239627 A1 * | 8/2019 | Fant | ................ | E04H 15/30 |

* cited by examiner

FIELD PACK

CROSS-REFERENCE TO RELATED APPLICATIONS

This application claims priority to U.S. Provisional Application No. 62/627,509, filed on Feb. 7, 2018, which is incorporated herein by reference in its entirety.

FIELD OF INVENTION

The present invention relates to a field pack or blind having multiple uses including hunting and bird watching. The present invention also provides a system and method for using such a field pack or blind.

BACKGROUND

Hunting or viewing blinds are typically used by a hunter or animal watcher to conceal or camouflage the hunter's or animal watcher's position and/or scent when hunting for or viewing animals. A blind may increase the hunter's or animal watcher's success of avoiding detection by the animals allowing the animal to be shot by the hunter or the animal to be viewed by the watcher. Conventional blinds, however, are typically placed on a ground surface in a forest or field, and they are not easily portable, deployable and retractable when the use of the blind is complete.

The user of the blind typically places their equipment on the ground surface in the compartment formed by the blind, but conventional blinds have obstructions that can reduce the space available for a user to move within the hunting blind and to be further protected from the elements such as wind, rain, snow and the like. Further, conventional hunting blinds are configured to rest on a flat surface at a location of use and are not easily adapted to the variations in the terrain. The conventional blinds are not typically capable of being assembled on a hillside or uneven surface.

There remains a need in the art for a hunting or animal watching blind that is easily transported to a location of desired use. A further need exists for a blind that is easily assembled and disassembled and packed up in the field. A further need exists for a blind assembly that can be positioned on a hillside or uneven surface. A further need exists for a blind assembly that can be positioned off the ground surface in a swampy or damp area. A further need exists for a blind that provides protection of the user and the user's equipment from the environmental elements and to keep the user's equipment, food, sleeping equipment, clothing and the like from becoming moist.

It is desired that any field pack with an integrated blind system also include a hood assembly for covering the top of any compartment formed by the blind. Additionally, because the user's comfort in a potentially harsh environment is tantamount, such a field pack with an integrated blind system should also include a seat for use by the user. Additionally, it is desired that the field pack should include a vest system for holding the user's items that the user intends to use once the blind is deployed for use. Furthermore, a long-felt desire is providing a field pack with detachable features allowing such a featured item to be used separate from the field pack and to allow camouflaged features to be replaced by blinds, hoods, vests and/or seats that have a camouflage color or design that is more appropriate for the environment of use and the different or various seasons. The field pack and blind of the invention is configured to address these as well as other long-felt needs for such field packs and blinds.

SUMMARY OF INVENTION

The present invention relates to a field pack and a field blind having multiple uses including hunting and bird watching. Without intending to be bound by theory, the field pack and the field blind of the invention offers improved functionality over backpacks or field packs conventionally known in the art and blinds that are conventionally available.

An aspect of the invention provides a field pack or a field blind having a blind assembly. Further pursuant to this embodiment of the invention, the blind assembly comprises a tract assembly, a blind configured to be extended from the field pack and retracted back into the field pack using the tract assembly, a blind cartridge placed within a body of the field pack housing the blind, the blind cartridge comprising a roll to extend and retract the blind wing, and a support rod that supports the blind once the blind has been extended into its desired position.

In certain embodiments of the invention, the tract assembly has an inner tract and an outer tract.

In an embodiment of the invention, the blind may include a left blind having a left blind cartridge and a right blind having a right blind cartridge. In certain embodiments of the invention, the blind cartridge is detachable from the field pack.

In an embodiment of the invention, the field pack additionally has a vest. In an embodiment of the invention, the vest may be secured to the field pack using a plurality of connectors and each of the plurality of connectors has a pad to reinforce the connection to the field pack.

In certain embodiments of the invention, the field pack additionally has a hood assembly, for example, the hood assembly having a hood tract assembly, and a hood configured to be extended from the field pack using the hood tract assembly, the hood having a main pivot connected to a hood frame that becomes extended from the field pack about which the hood pivots outwardly from the field pack. In a particular embodiment of the invention, the hood tract assembly has an inner hood tract and an outer hood tract. In yet other embodiments of the invention, the hood is detachable from the field pack for use apart from the field pack.

The field pack may additionally comprise a seat assembly, pursuant to an embodiment of the invention. According to an embodiment of the invention, the seat assembly includes a seat, a plurality of legs that fold out from the seat to support the seat, and a lock lever to lock each of the legs into place. In certain embodiments of the invention, the legs for the seat are telescoping to allow the seat to be balanced into place on uneven or hilly surfaces through adjustment of the telescoping legs.

In one embodiment of the invention, the seat pivots outward from the field pack, while in another embodiment of the invention, the seat slides along a tract out of and retracts back into a recessed compartment disposed inside the field pack. In certain embodiments of the invention, the seat is detachable from the field pack.

In another aspect of the invention, the invention provides a field pack having a blind assembly, a hood assembly, and a seat assembly. Further pursuant to this aspect of the invention the blind assembly includes a tract assembly, a blind configured to be extended from the field pack and retracted back into the field pack using the tract assembly, a blind cartridge placed within a body of the field pack housing the blind, the blind cartridge comprising a roll to extend and retract blind wing, and a support rod that supports the blind once the blind has been extended into its desired position.

Still further pursuant to this aspect of the invention, the hood assembly has a hood tract assembly and a hood configured to be extended from the field pack using the hood tract assembly, the hood having a main pivot connected to a hood frame that becomes extended from the field pack about which the hood pivots upwardly and outwardly from the field pack.

Yet, still pursuant to this aspect of the invention, the seat assembly comprises a seat, a plurality of legs that fold out from the seat to support the seat, and a lock lever to lock each of the legs into place.

Further included within this another aspect of the invention are the elements disclosed in the other aspects of the invention as provided herein.

According to yet another aspect of the invention, the invention includes a method for using a field blind comprising the steps of providing a field pack having a blind assembly, deploying a left blind wing from the field pack, deploying a right blind wing from the field pack, securing the left blind wing to a surface, substantially aligning an end of the left blind wing to the right blind wing, and securing the right blind wing to the surface. In certain embodiments of the invention, the left blind wing and the right blind wing form a concealed area where a user remains concealed from animals.

In an embodiment of the invention, the method of using a field blind may additionally include providing a field pack that additionally comprises a hood assembly and deploying a hood of the hood assembly to cover a top portion of the enclosed area to further shield the user. In certain embodiments of the invention, the hood may be further extended to substantially cover the enclosed area formed by the left blind wing and the right blind wing.

In yet another embodiment of the invention, the method of using a field pack may additionally comprise providing a field pack that additionally comprises a seat assembly and deploying a seat of the seat assembly within the compartment.

Other aspects and embodiments will become apparent upon review of the following description taken in conjunction with the accompanying drawings. The invention, though, is pointed out with particularity by the included claims.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Preferred embodiments of the invention may be described, but this invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments of the invention are not to be interpreted in any way as limiting the invention.

As used in the specification and in the appended claims, the singular forms "a", "an", and "the" include plural referents unless the context clearly indicates otherwise. For example, reference to "a tract" includes a plurality of such tracts.

It will be understood that relative terms may be used herein to describe one element's relationship to another element as, for example, may be illustrated in the Figures. It will be understood that relative terms are intended to encompass different orientations of the elements in addition to the orientation of elements as illustrated in the Figures. It will be understood that such terms can be used to describe the relative positions of the element or elements of the invention and are not intended, unless the context clearly indicates otherwise, to be limiting.

Embodiments of the present invention are described herein with reference to various perspectives, including, for example, perspective views that are representations of idealized embodiments of the present invention. As a person having ordinary skill in the art would appreciate, variations from or modifications to the shapes as illustrated in the Figures or the described perspectives are to be expected in practicing the invention. Such variations and/or modifications can be the result of manufacturing techniques, design considerations, and the like, and such variations are intended to be included herein within the scope of the present invention and as further set forth in the claims that follow. The articles of the present invention and their respective components described or illustrated in the Figures are not intended to reflect a precise description or shape of the component of an article and are not intended to limit the scope of the present invention.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

As used herein, a "blind" refers to an assembly included in an all-in-one pack typically for outdoor use used to conceal an area. Such blinds may generally be included in a field pack, but will also encompasses, without intending to be limiting in any way, an ambush blind, a bush blind, a stock and sit blind, a go n' sit blind, and a hide and seek blind. Such blinds may be useful as a hunting pack, such as, for example, a turkey hunting blind, and an animal watching pack, such as, for example, a bird watching blind. One purpose of such a blind, is to allow the user to blend in and be camouflaged amongst the user's surroundings to prevent any such game or wildlife in observation from being able to detect the presence of the user. Non-limiting examples of uses of a blind pack for hunting include deer hunting, turkey hunting, hog hunting, coyote hunting, and rabbit hunting. Uses of the blind pack for other purposes include, but are not limited to, viewing, video capture or picture-taking of wildlife. Another use of the blind pack includes military purposes.

The blinds may come in different sizes, colors, camouflage patterns, and varying models supporting, in particular, an intended use of the blind. For example, as further described herein, the blinds may include recessed sun blocking and/or redirecting hoods to keep the sun out of the user's eyes. Such a sun-blocking apparatus may also seclude the user preventing the user's detection by wildlife or other personal in military use. The sun-blocking hood will allow the user to have some degree of undetected movement within the blind preventing the user from being detected by wildlife, for example, while the use hunts or takes pictures/videos of such wildlife.

The field pack or blind pack may be sized based upon the intended use and/or a particular user. Smaller sizes generally are intended for use by youths while larger sizes for persons other than youths. Varying configurations of the design may also be intended to accommodate a particular use. In certain configurations, the blinds or field packs are configured to be stackable allowing a multiplicity of blinds to be stored in a smaller area. The all-in-one nature of the pack allows for configurations that provide various types of blinds such as, for example, an ambush blind, a brush blind, a stock and sit blind, a go 'n sit blind, a hide and seek blind, and an observation blind. Such all-in-one blinds may be used for deer hunting, turkey hunting, hog hunting, boar hunting, coyote hunting, rabbit hunting, and any other activity where the use desires or needs to be confined to a space and blend in with the environment. Such blinds are also useful for concealment to take pictures or video of certain wildlife as well. The blinds may also be configured to be used by military personal positioned in the field. The all-in-one blinds of the invention are completely portable allowing a user to easily transport the blind system to the point of use and then easily deploy the blind. Furthermore, the blind system is configured to easily be retracted back into the field pack allowing the user to then transport the blind system out of the area of use.

As further described herein, the blind may be equipped with a recessed or slide out seat, chair or stool that can be used while attached to the blind, in certain embodiments of the invention, or even detached from the blind, in certain other embodiments of the invention.

In an embodiment of the invention, the blind includes slide out curtain blinds. In certain embodiments of the invention, once the curtain blinds are slid out, they can be pulled out forward and towards the user's feet or even angled inward to create a full enclosure to allow for maximum concealment. The blinds may be configured to be retractable and may be easily slid back into the concealment compartment in their recessed position. Such blinds may also easily be readjusted to conform to a different configuration depending upon the needs of the user. In certain embodiments of the invention, curtain blinds may be configured to allow for quick setup, readjustment, and retractability. The blind wings may have different camouflage patterns to best match the user's surroundings. In an embodiment of the invention, the blind wings may be easily replaced to allow the user to conform concealment using the blind to different environments, varying times of the year, and a particular geographic setting. Replacement of the blind wings and other camouflaged materials of the field pack, may allow the field pack to have various different uses. For example, use of the field pack for turkey hunting is typically in the spring with the landscape just turning green in nature and colors emerging from floral items. On the other hand, duck hunting is typically allowed during the winter, with a landscape that is more brown in nature and may additionally be conducted in a swampy or marshy environment. Thus, the ability to adapt the camouflage colors and patterns of the field pack is important in supporting the use of the pack in a multitude of uses.

In an embodiment of the invention, certain materials of the blind including perhaps the blind wings may be constructed using a waterproof material that allows items included within the blind as well as the user to remain dry in inclement conditions. In certain embodiments of the invention, blind materials may be used that provide an insulative barrier to allow the user to remain at a more comfortable temperature than the surrounding environment.

In an embodiment of the invention, as further provided herein, the blind includes a hood. In certain embodiments of the invention, the hood is configured to slide upward and then expand forward over the user's head to protect the user from the elements such as, for example, without intending to be limiting, the sun, rain, sleet, and snow. The hood also allows the user to be more fully concealed within the blind permitting head movement to allow a wider perimeter view and further allows the user to have continued use of their hands for a wide variety of activities associated with the use of the blind or allowing the user to eat and/or drink while concealed within the blind. A fully deployed blind may then be easily retracted, tucked away, and easily moved by the user as in carry or wear.

Figure 1:
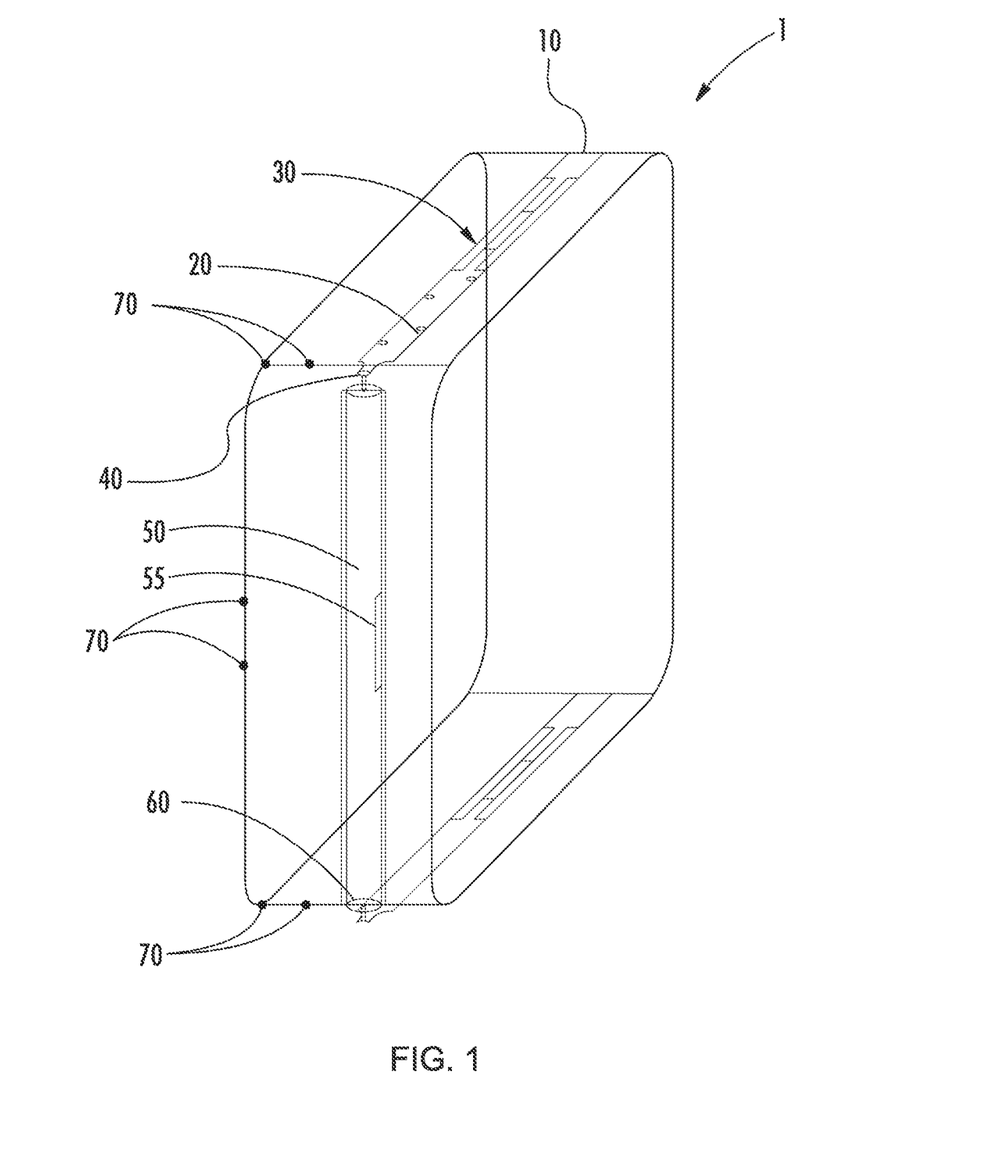
FIG. 1 is a three-dimensional view of a field pack according to an embodiment of the invention.

FIG. 1 is a three-dimensional view of a field pack according to an embodiment of the invention. As shown in FIG. 1, a field pack 1 may comprise series of tract systems. For example, the field pack 1, in the exemplary embodiment of FIG. 1, includes a tract assembly 10 having an inner tract 20 and an outer tract 30. The inner tract 20 rides in the outer tract 30. The inner tract 20 is attached to a roll-out blind housed within the roll-out cartridge 50, and the inner tract 20 allows the roll-out blind to be extended out from the field pack 1 and retracted back to its recessed compartment where the roll-out blind is concealed. The roll-out blind housed within the roll-out cartridge 50 may be released from the roll-out cartridge 50 by pulling on a handle 55. This configuration allows the roll-out blind to be easily stored in the roll-out cartridge 50 embedded within the field pack 1 where it remains concealed as the field pack 1 is being worn and transported to its destination of use. The exemplary embodiment of FIG. 1 shows a tract assembly 10 at both the top and bottom of the field pack 1.

The portion of the inner tract 20 that is attached to the roll-out blind may be configured to have a quick release 40 allowing the roll-out cartridge 50 configuration housing the roll-out blind to be release from the field pack 1 using the quick release 40. A released roll-out cartridge 50 housing the roll-out blind may be used separately from the field pack 1. Additionally, multiple roll-out cartridges may be available allowing for different camouflage colors, styles, designs, and patterns to be used with the field pack 1 depending upon the terrain where the field pack 1 is intended to be used. The roll-out cartridge 50 may be configured to allow for easy release of the roll-out blind allowing for the roll-out blind to be easily replaced in the event of damage or desired camouflage color, style, design, and/or pattern replacement. The interchangeability feature allows for a field pack 1 that is configured to have a roll-out blind on each side of the field pack 1, which is a preferred configuration in certain embodiments of the invention, to allow both blinds to be replaced to coordinate the camouflage color, style, design, and/or pattern replacement.

In the exemplary embodiment of FIG. 1, the inner tract 20 is held in place and secured by the outer tract 30. In an embodiment of the invention, the outer tract 30 allows for the inner tract 20 to move in place allowing the roll-out blind to be extended and retracted. In another embodiment of the invention, the inner tract 20 is configure as a cylindrical pipe that is fit within the outer tract 30 configured as a larger cylindrical pipe. As the smaller pipe rotates within the larger pipe, the roll-out blind becomes extended or retracted depending upon the direction the inner pipe turns within the outer pipe.

The tract assembly 10 may be configured to have an automatic extension and retraction system to allow the roll-out blind to be extended and retracted by, for example, the push of a button, a lever system, a push/pull assembly, as well as other mechanisms that would be recognized in the art by those having the benefit of this disclosure. Such an automatic extension and/or retraction system may be operable through a spring assembly, an air fed and vacuum release chamber, as well as any other assembly known in the art to allow for the extension and retraction of objects. In certain embodiments of the invention, the roll-out blind may be configured to be easily extended, while, in certain embodiments of the invention, the roll-out blind frame may be extended by about 6 to about 8 inches, prior to being further extended and even retracted into the tract assembly 10.

The roll-out cartridge 50 houses an extendable and retractable blind wing whose position is maintained by surrounding a roll 60 included within the roll-out cartridge 50. As previously presented, the blind wing may be configured to have any color, style or pattern, which itself may be interchangeable allowing the extended blind wing to blend in with its surroundings. In certain embodiments of the invention, the roll 60 may be spring loaded allowing the blind wing to be rolled out using the tract assembly 10.

In an embodiment of the invention, the top of the field pack 1 is anywhere from about 15 inches to about 22 inches in width. In certain embodiments of the invention, the field pack 1 is anywhere from about 18 inches to about 24 inches in height. In certain embodiments of the invention, the field pack 1 is from about 8 inches to about 12 inches in depth. In certain embodiments of the invention, the blind wing is configured to be rolled out to about 6 feet to about 8 feet.

Figure 2:
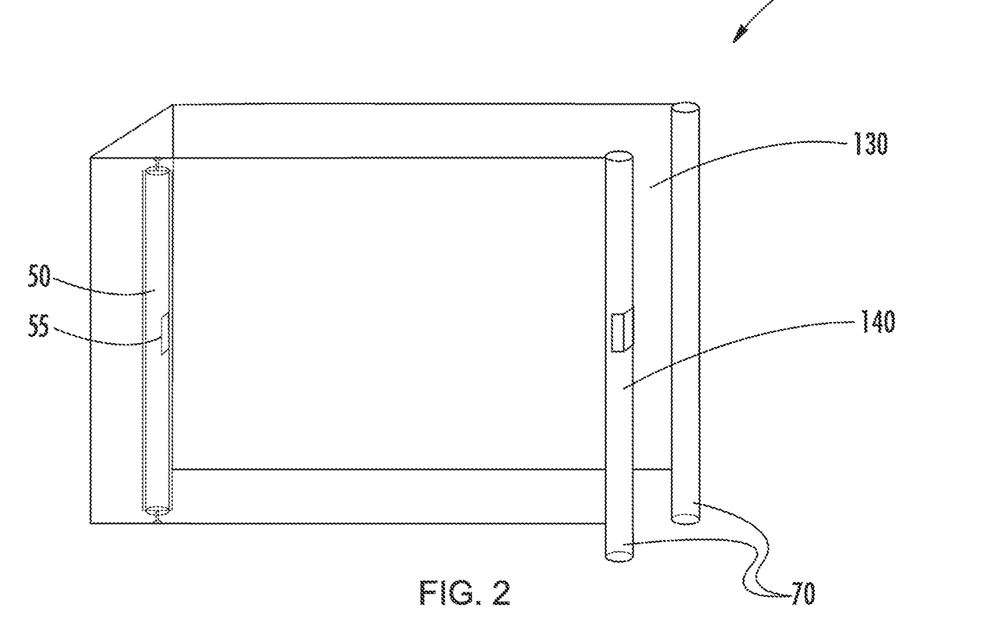
FIG. 2 is a three-dimensional view of a field pack showing extended pull out blinds, according to an embodiment of the invention.

FIG. 2 is a three-dimensional view of a field pack showing extended pull out blinds, according to an embodiment of the invention. This view of the field pack 1' includes an extended left blind wing 130 and an extended right blind wing 140. As shown in the exemplary embodiment of FIG. 2, the extended end of the blind wing may be configured to have a spike or support rod 70. The spike or support rod 70 may be inserted into the ground, for example, to hold the extended left blind wing 130 and respective right blind wing 140 upright. In an embodiment of the invention, the spike or support rod 70 is configured to rotate outwards into an "X" like configuration with another spike or support rod 70 to provide more secure lateral support for the blind.

In certain embodiments of the invention, the upright blind wing extends anywhere from about 20 inches to about 24 inches in height. The height of the upright blind wing will depend somewhat on the upright size of the field pack 1' such that roll-out cartridge 50 may fit within the field pack 1'. When not in use, the left blind wing 130 and the right blind wing 140 are recessed into the field pack 1' for easy transport otherwise an exposed recessed blind wing would have the potential of getting caught in trees, brush or any protruding object as the user wearing the pack travels through a wooded area or a upon a trail. Use of the pack is more preferred when an extended left blind wing 130 and extended right blind wing 140 blends in with the surroundings allowing the user to go unnoticed by game or wildlife the user may be observing. Inasmuch, interchangeable blinds having varying camouflage colors, styles, designs, and patterns is preferred to allow the user to select a blind that will better blend in with the natural surroundings where the user intends to use the field pack 1'. For example, a field pack for game hunting different animals during varying times of the year would require blinds that blend in with the terrain for that time of year. Different colors and patterns are required to allow the pack to be adapted and blend in with the woodscape that is appropriate for the season. A well camouflaged field pack with extended blinds allows the user to get closer access to animals since the animals will not be able to readily see a user shielded by a blind pack that blends in well with the landscape.

Material that may be used for the roll-out blind includes, but is not limited to, a woven material manufactured using natural fibers or organic polymeric or inorganic polymeric fibers, a nonwoven material, and a sheet of polymer material such as vinyl. In preferred embodiments of the invention, the material for the roll-out blind is waterproof such that the field pack may continue to be used during rain, snow or sleet and the like. During such conditions, a user may unsecure the blind wing from the ground by pulling out the spike or support rod 70 from the ground and provide cover for himself or herself to remain dry. In certain embodiments of the invention, the field pack includes a hood, as further described herein, that may additionally provide shelter for the user. Such hoods are detachable and exchangeable to allow them to be suitably camouflaged to blend in with the landscape where the field pack is being used.

The spike or support rod 70 is intended to be securely attached to the blind wing. For example, this may be accomplished through weaving or sewing the spike of support rod into the blind wing. The length of the spike or support rod 70 is approximately the height of the roll blind material, but is preferably configure to have a spiked in the extends just past the roll blind material allowing the spike or support rod 70 to be easily secured into the ground to support the extended left blind wing 130 and the extended right blind wing 140. In certain embodiments of the invention, the spike or support rod 70 may be adjusted such that it extends just past the extended left blind wing 130 and the extended right blind wing 140 allowing the spike or support rod to be readjusted to allow a retracted blind wing to fit within the roll-out cartridge 50. In an embodiment of the invention, the spike or support rod 70 includes a large diameter tube and smaller diameter tube inserted in the large diameter tube. This construction allows the small diameter tube to be retracted some out of the large diameter tube to allow the spike or support rod 70 to be inserted in the ground to support the extended left blind wing 130 and the extended right blind wing 140. In an embodiment of the invention, this configuration includes a locking mechanism such as a compression assembly, for example, that may be turned to lock the small diameter tube into place in the large diameter tube, to allow the user to extend the small diameter tube to any length that is needed to allow the extended left blind wing 130 and the extended right blind wing 140 to be supported when the small diameter tube is inserted into the ground. Once a user is done using the field pack 1', the spike or support rod 70 may be pulled out of the ground, and the smaller tube may be retracted back into the larger tube to allow the spike or support rod 70 to more easily fit within the roll-out cartridge 50. In preferred embodiments of the invention, the bottom end of the small diameter tube that is intended to be inserted in the ground to support an extended blind wing is configured to have a pointed end to more easily allow the spike or support rod 70 to be inserted into the ground. The diameters of the large diameter tube and the small diameter tube are selected such that when the spike or support rod 70 is inserted in the ground, the strength and stability of the spike or support rod 70 is sufficient to support an extended blind wing even in somewhat windy conditions.

Figure 3:
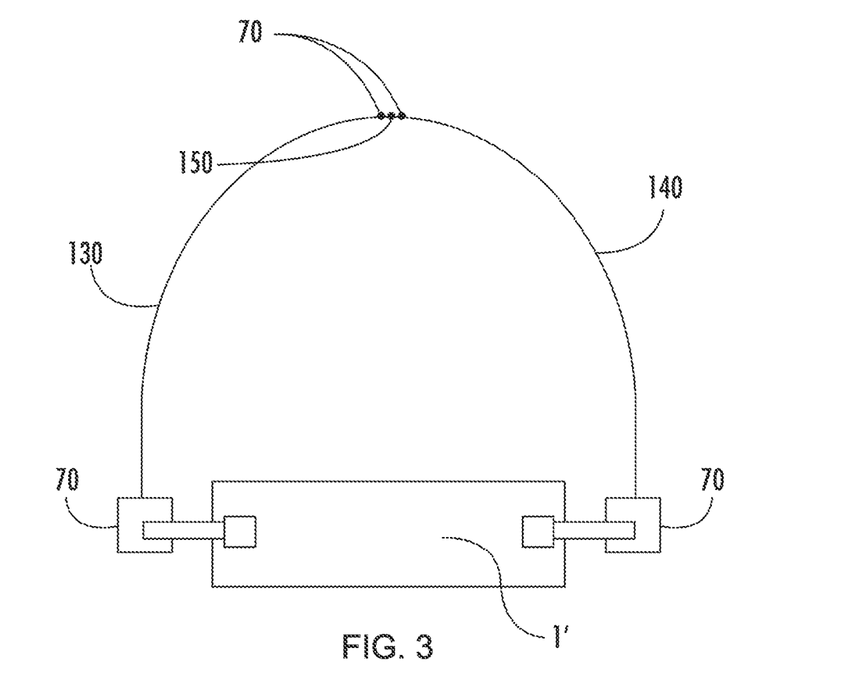
FIG. 3 is a top view of a field pack showing the extended pull out blinds being configured to be in a shelter position, according to an embodiment of the invention.

FIG. 3 is a top view of a field pack showing the extended pull out blinds being configured to be in a shelter position, according to an embodiment of the invention. A shown in FIG. 3, the extended left blind wing 130 and the extended right blind wing 140 are positioned next to each other at their ends to meet at an interconnect 150. A plurality of spikes or support rods 70 are provided to secure the extended left blind wing 130 and the extended right blind wing 140 in place. The configuration of the extended left blind wing 130 and the extended right blind wing 140 shown in FIG. 3 allows the user to be positioned inside the cavity formed by the extended left blind wing 130 and the extended right blind wing 140 and, due to the camouflage provided by the blind wings, not be seen by any animals the user is intending to view.

Figure 4:
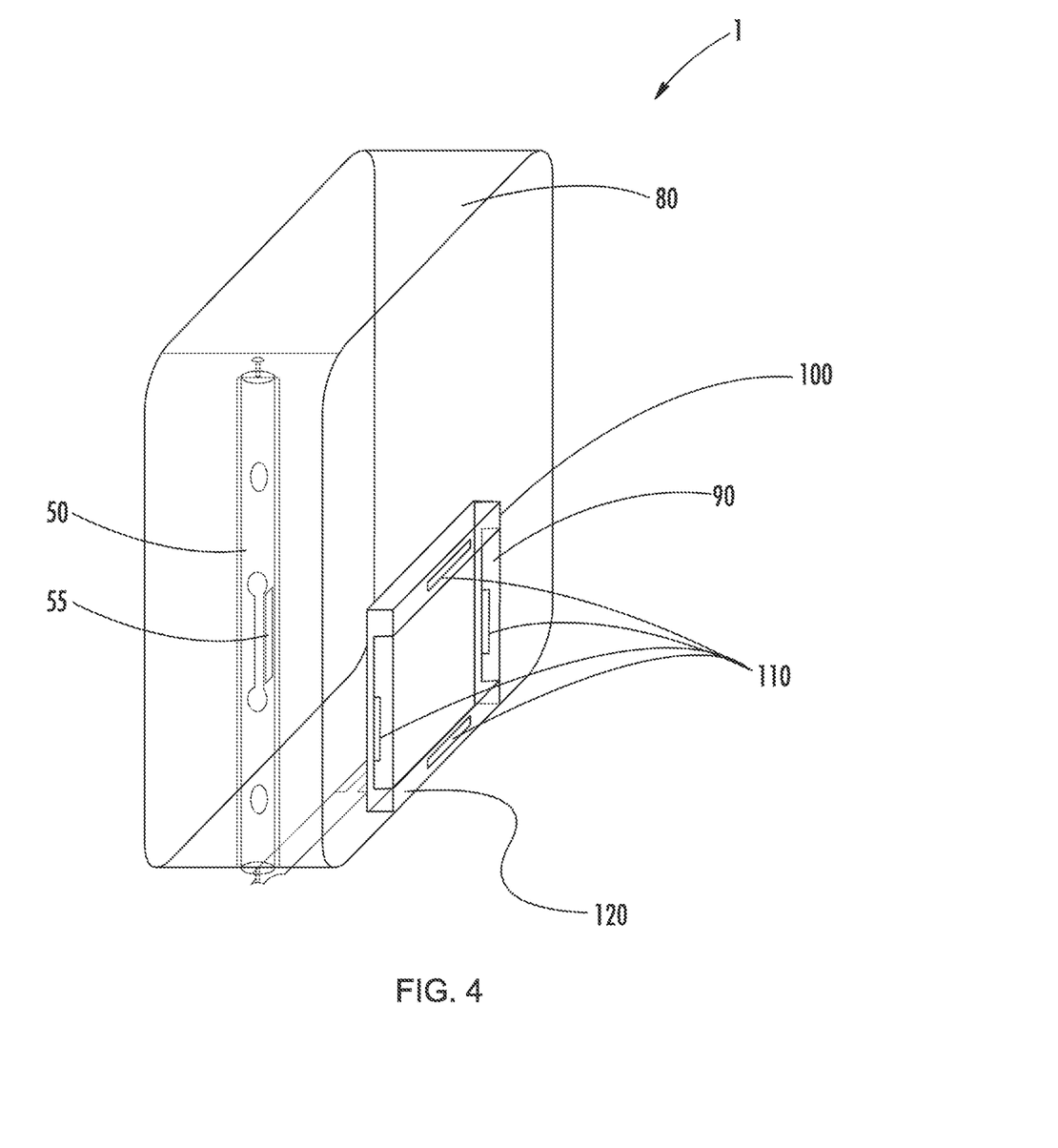
FIG. 4 is a three-dimensional view of a field pack according to another embodiment of the invention.

FIG. 4 is a three-dimensional view of a field pack according to another embodiment of the invention. The field pack 1 of FIG. 4 has a seat 90 that is recessed or stored in a seat compartment 100 that is disposed in the side of the field pack 1 that will be positioned on the user's back during transport.

The recessed seat 90 in the seat compartment 100 will allow for a more comfortable fit for the user during transport. To provide a perspective view of this exemplary embodiment of FIG. 4, the extendable/retractable roll-out blind, preferably having blind pulls to assist with pulling out the blind, is stored in the roll-out cartridge 50 on the right side of the field pack 1 and a roll-out cartridge (not visible) on the left side of the field pack 1. The seat 90 may be manufactured of a metal or plastic slat-based assembly, and, optionally, include a seat pad (not illustrated in FIG. 4). The seat 90 includes fold out legs 110 to allow for a more stable seat for the user once the seat 90 is pivoted outward at the seat pivot 120 out of its seat compartment 100. Once the seat 90 is pivoted outward, it will preferably lie below an extended blind wing that when retracted is held inside the roll-out canister 50.

The fold out legs 110 may be positioned approximately at each corner of the seat according to one embodiment of the invention. In an embodiment of the invention, the legs 110 may be automatically locked in place when extended and unlocked from the automatic lock position by a downward pull on each leg 110. In certain embodiments, the leg may be extended by a turn of compression-style fitting clamp. In another embodiment of the invention, the legs may additionally include a lock lever (not illustrated in FIG. 4) to allow the legs 110 to be locked in place and then unlocked by changed position of the lock lever. In an embodiment of the invention, the legs 110 are telescoping and lockable in it telescoped position to allow for the height of the seat to be adjusted and to level the seat when used on an uneven surface or ground. Optionally, the seat 90 may be detachable at the seat pivot 120 to allow the seat 90 to be used by itself without remaining attached to the field pack 1. When the seat 90 remains attached to the field pack 1, the backside of the field pack 1 serves as a backrest when the seat 90 is pivoted outward for use. Optionally, the user may choose to continue to wear the field pack 1 during the user's use of the field pack. In other embodiments of the invention, a user requiring mobility within the shielded space will not generally continue wearing the field pack 1.

Figure 5:
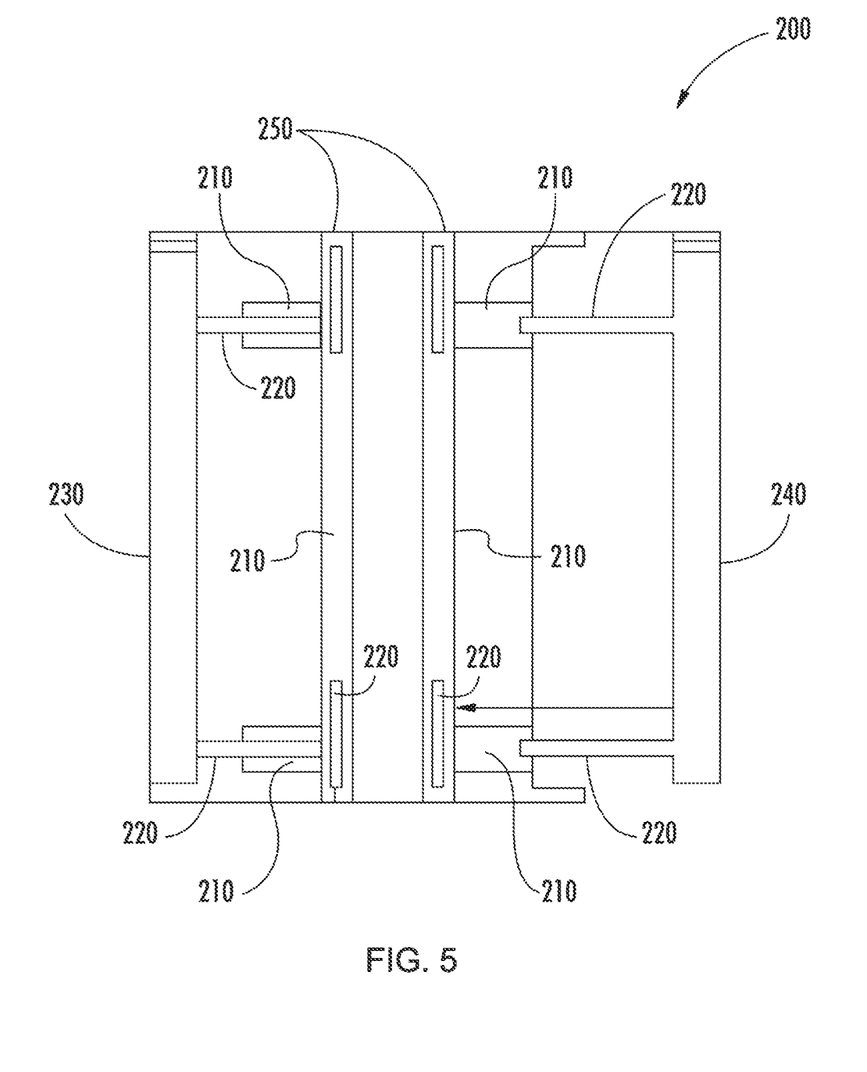
FIG. 5 is a side view of a field pack showing the tract system for the blinds, according to certain embodiments of the invention.

FIG. 5 is a side view of a field pack showing the tract system for the blinds, according to certain embodiments of the invention. The blind tract assembly 200 includes an outer member 210 containing an inner concentric member 220. In a tube-based system, according to an embodiment of the invention, the outer member 210 is a larger tube tract, while the inner concentric member 220 is a smaller tube tract housed within the larger tuber tract or the outer member 210. The inner concentric member 220 provides the ability for the roll-out blind to extend from and retract to the recessed portion of the blind pack where the retracted roll-out blind is held. This allows the roll-out blind to be for the most part concealed as the field pack is being transported by the user. Both a retracted blind roll-out 230 and an extended blind roll-out 240 is shown in the exemplary embodiment of FIG. 5. Hood tracts 250 may extend from the top part of the blind tract assembly 210 and a tract assembly for the seat assembly may extend from the bottom part of the blind tract assembly 210. Similarly, the hood tract system and the seat tract assembly both may include a similar configuration to the blind tract assembly 210 illustrated in FIG. 5.

The structured frame includes a vest attached to the front of the field pack or the side of the field pack that is reversed from the side intended to fit on the users back as the user is wearing the field pack. In preferred embodiments of the invention, the vest is manufactured from a material that is rainproof or water resistant. The field pack having the vest attached is worn similar to the way a backpack is worn.

Figure 6:
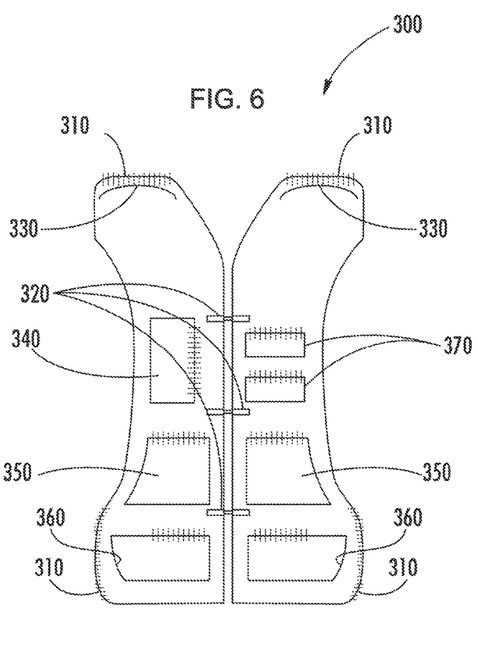
FIG. 6 is an outside view of a front portion of a vest, according to an embodiment of the invention.

FIG. 6 is an outside view of a front portion of a vest, according to an embodiment of the invention. In this exemplary embodiment of the invention, the vest outside front 300 includes zipper portions 310 for securing the vest to the frame of the field pack. The closure points are selected such that it will place the less fatigue and be more comfortable for the user wearing the field pack. In the exemplary embodiment of FIG. 6, there are for points where the zipper portions 310 attach the vest to the frame of the field pack. In certain embodiments of the invention, a strap assembly having tabs may be used instead of or in addition to zipper portions 310. In a preferred embodiment of the invention, the vest is connected to the frame by both a zipper and a snap to provide an extended degree of security especially for field packs that are intended to be subjected to more rugged use where if one of the closure means fails the other is in place as a backup. The vest outside front 300 may additionally comprise one or more closure apparatuses 320 to close access to the inside of the field pack where other items may be stored. The closure apparatuses 320 also keeps the vest secured around the user when it is being worn. When closure apparatuses 320 of the vest are released, the sides of the vest outside front 300 may be flipped over to allow access to the vest inside front as further described in FIG. 7. The closure apparatuses 320 may be, in a non-limiting example, snaps affixed to the vest outside front 300. Of course, any other type of closure apparatus 320 or even combination of such types as known by a person having ordinary skill in the art may be used such as, in non-limiting examples, a button, VELCRO® and a zipper. The vest outside front 300 also may comprise one or more pads 330 configured to provide a comfortable layer of shielding to the user. It is preferred that these pads 330 be located in the vicinity of where the vest is attached to the frame. The pads also provide reinforcement to the points where the vest is attached to the frame. The pads 330 are affixed to the vest. In an embodiment of the invention, the pads 330 may be affixed to the vest by being sewn to the vest. The vest outside front 300 may also include a multiplicity of pockets.

The multiplicity of pockets are affixed to the vest. In an embodiment of the invention, the pockets are sewn to the vest will still leaving a side, at least in part, open to allow for insertion of items for holding and/or storage. The open portion of the pocket may be provided with a closure such as, for example, a button closure, a zipper closure, a snap closure, a VELCRO closure, and the like. In the exemplary embodiment of FIG. 6, the vest outside front 300 includes an outside side zippered pocket 340, an outside top zippered pocket 350, an outside top zippered wide pocket 360 and an outside top zippered small pocket 370. While the exemplary embodiment of FIG. 6 shows pockets having a zippered closures other types of closures may be used including, without intending to be limiting, fold-over closures, button closures, straps that have snaps and/or are tied, and other types of closures means well-known to those having ordinary skill in the art having the benefit of this disclosure.

The embodiment of the vest provided in FIG. 6 is only one style. There are many other styles, models, and camouflage designs and colors that may be configured for the vest to allow the vest to be tailored to a specific use and/or application. In an embodiment of the invention, the vest may be interchangeable allowing a vest to be adapted to a different use or the same use but having a different camouflage color, style, design, and/or pattern to allow the field pack to better blend in with the environment where the field pack is intended to be used. The intended use will also guide how many pockets are included on the vest and where those pockets would be located. For example, a field pack used for turkey hunting would have a large number of pockets on both the outside and inside of the vest, as further described below.

Figure 7:
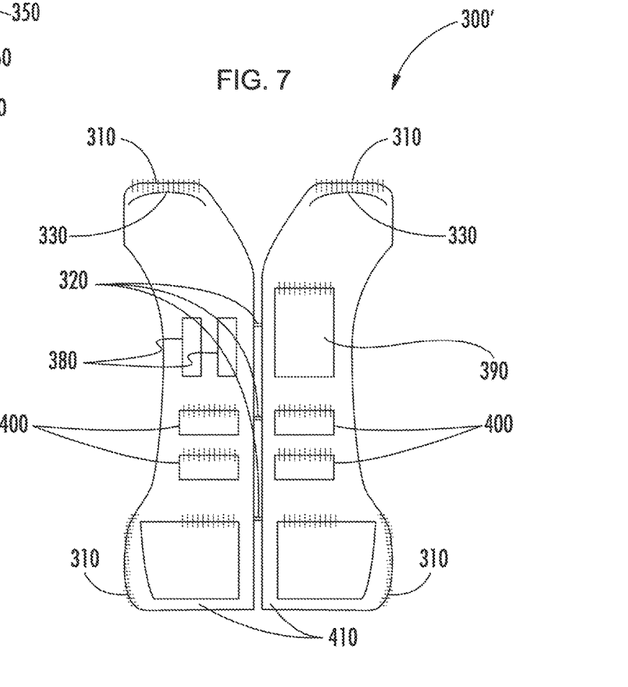
FIG. 7 is an inside view of a front portion of a vest, according to an embodiment of the invention.

FIG. 7 is an inside view of a front portion of a hunting vest, according to an embodiment of the invention. The vest inside front 300' of FIG. 7 is a reverse image of the vest outside front 300 of FIG. 6 again illustrating the comparable positions of zipper portions 310, the closure apparatus 320, and the pads 330 as previously discussed. Again, as with the vest outside front 300, the pockets of the vest inside front 300' may vary depending upon the intended use of the field pack. The exemplary embodiment of the vest inside front 300' illustrated in FIG. 7 includes a vertical pocket 380 or two vertical pockets 380 as shown in the exemplary embodiment of FIG. 7, an inside top zippered pocket 390, at least one or, as shown in the exemplary embodiment of FIG. 7, a multiplicity of inside top zippered small pockets 400, and an inside in part top zippered large pocket 410 or, as shown in the exemplary embodiment of FIG. 7, adjacent inside in part top zippered large pockets 410 adjacent to each other on each side at a lower portion of the vest inside front 300'. As shown with the vertical pocket 380, the pockets may be open or configured to have closures such as the zippers that have been included on the inside top zippered pocket 390, the inside top zippered small pocket 400, and the inside in part top zippered large pocket 410, but, as shown with the latter mentioned pocket, the opening to the pocket may only have a partial closure on one side of the pocket.

Optionally, the part that is not configured to have a closure may remain open or may be closed via attachment to the vest. While the exemplary embodiment of FIG. 7 illustrates these types of pockets, any of these may be included on the vest outside front as well. Any or all of the pockets of the vest outside front 300 and vest inside front 300' may be configured to have a see through mesh either in full or in part of the pocket. Optionally, a plastic, see-through cover may encompass the entire pocket of configured to only be part of the pocket. All pockets may also be configured to be waterproof and/or covered with a waterproof coating.

In certain embodiments of the invention, a hood assembly is included on the field pack. In certain other embodiments of the invention, a field pack may be configured to allow for the addition of a hood assembly. A hood frame of the hood assembly may be attached to outer tracts that have been attached to the blind frame, in particular, to an upper part of the blind either to the very outside of the blind or recessed into the blind. Such a configuration is configured to allow an inner slot to be exposed where a quick connect/disconnect mechanism, such as a tee handle for example, is attached to the hood frame and allows the hood to slide up for use and down for storage.

Figure 8:
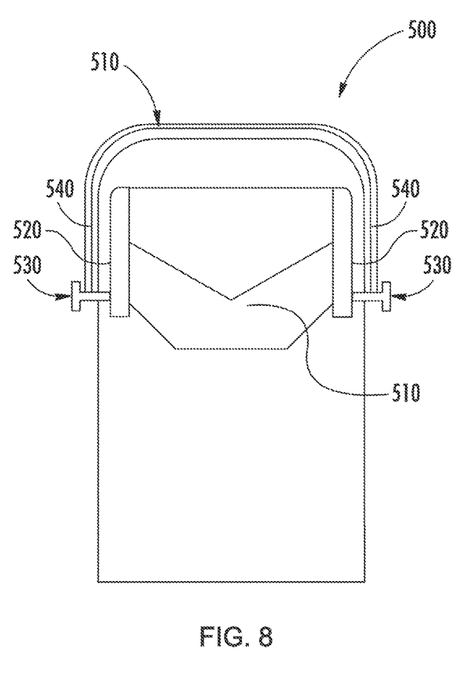
FIG. 8 is a front view of a field pack showing a retracted hood canopy, according to certain embodiments of the invention.
Figure 9:
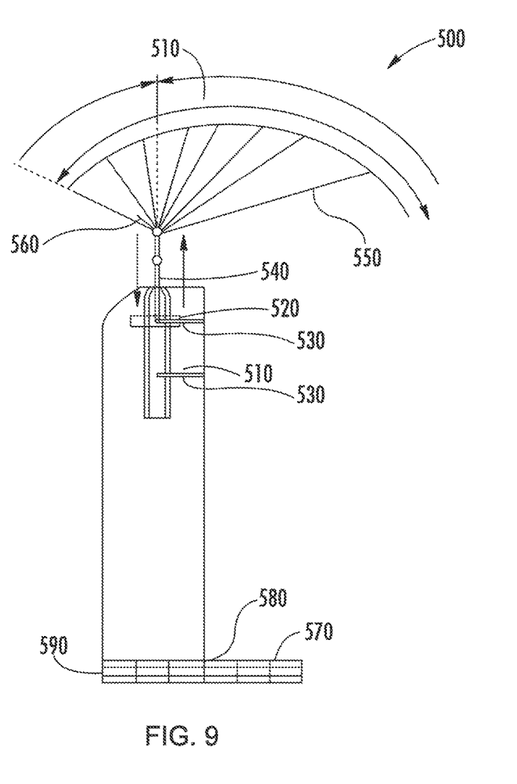
FIG. 9 is a side view of a field pack showing an extended hood canopy, according to certain embodiments of the invention.

FIG. 8 is a front view of a field pack showing a retracted hood canopy, according to certain embodiments of the invention. The hood assembly 500 of FIG. 8 includes a hood 510. The hood assembly 500 includes sliding tract 520, as described above, and a handle mechanism 530, such as, in a non-limiting example, a tee handle. As explained above, the handle mechanism 530 allows the hood 510 to be moved along the sliding tract 520 to be extended to deploy over the user's head or to retract to recess back into its stored position in the field pack. Once the hood is in its desired position to shield the head of the user, the handle mechanism 530 may be used to secure the hood 510 into place on the sliding tract 520. For example, the handle mechanism 530 may be configured to be pushed in or pulled out to lock the hood 510 into place on the sliding tract 520, and then, respectively, pulled out or pushed in to unlock the hood 510 and allow the hood 510 to again move freely along the sliding tract 520. In certain embodiments of the invention, the handle mechanism 530 may be turned in one direction to lock the hood 510 in place on the sliding tract 520, and the handle mechanism 530 may be turned in the opposite direction to unlock the hood 510 from the sliding tract 520. Once the hood 510 has been extended to the desired position along the sliding tract 520 and locked into place using the handle mechanism 530, a hood canopy may then be extended from the hood 510, which is better illustrated in FIG. 9. FIG. 9 is a side view of a field pack showing an extended hood canopy, according to certain embodiments of the invention. The hood canopy is extended from the hood 510 along the extension pivot line 550 allowing the frame support 540 to be extended out further, while the hood 510 pivots about the main hood pivot point 560. A frame support 540 ensures the hood 510 in connection with the hood assembly 500 remains rigidly affixed to the field pack for use.

In addition to the hood canopy, the hood 510 may include a pack at the back of the hood 510 that may be extended towards the back of the hood 510 to provide additional shielding of the user from the sun or inclement weather and to maximize concealment shielding. The hood canopy and the optional pack may be extended back into the hood 510 and easily retracted back into the field pack using the handle mechanism 530 and sliding tract 520 to secure the hood 510 for transport.

The exemplary embodiment of FIG. 9 also illustrates another seat assembly that differs from the seat assembly presented earlier. The seat assembly of FIG. 9 includes a sliding seat 570 that slides out of and retracts back into a recessed compartment 580. The recessed compartment 580 allows the sliding seat 570 to be stored in the lower part of the field pack when not in use. The seat assembly of FIG. 9 is supported in the field pack by a sliding seat frame 590. Optionally, the sliding seat 570 may be detachable from the field pack. In another embodiment of the invention, the sliding seat 570 may be configured with tracts to allow it to be placed at alternative positions along the field pack allowing the sliding seat 570 to be elevated off the ground. Further pursuant to this embodiment of the invention, the sliding seat 570 may be locked in place at a desired position.

The flip down/fold out version of the seat similar to that illustrated in FIG. 4, for example, is preferably recessed into the field pack when not in use. Such a seat includes legs that may be locked into place to support the seat, and, optionally, the seat may be detachable to allow its use without the field pack. Storage of the seat in a recessed position in the field pack allows the seat to more easily be transported since it would not be in the way of the user transporting the field pack. In one embodiment of the invention, the seat may be spring loaded where the spring would be loaded as the seat is slid down and further positioned out from the field pack. When the spring tension is allowed to be released, the seat could be easily retracted back to its recessed storage position in the field pack. In certain embodiments of the invention, the seat is detachable from the field pack allowing it to be used apart from the field pack.

The material of the seat may be, in a non-limiting example, woven straps, preferably camouflaged woven straps in some embodiments of the invention. The seat may be configured to have a foam pad to be included in the seat. Such a foam pad may be zipped in, snapped in, and/or tied in allowing for the seat to be more comfortable especially when removed from the field pack for use without the need to take the field pack when a seat is needed. Such a pad may add height to the seat that may be needed depending upon the user (e.g., a child or a shorter than average person).

Figures 10, 11:
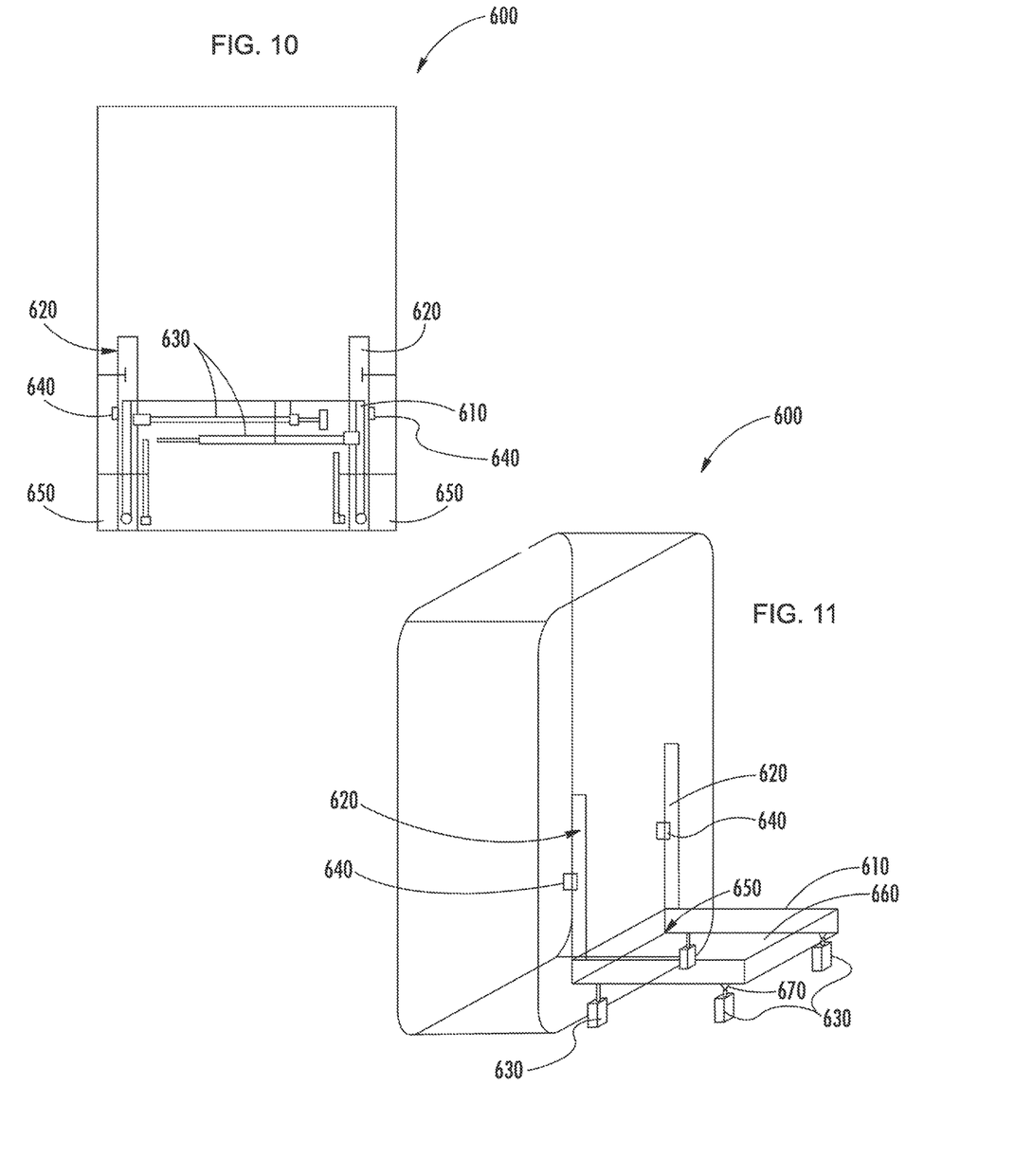
FIG. 10 is a front view of a field pack showing a tract for a seat platform, according to an embodiment of the invention.
FIG. 11 is a three-dimensional view of a field pack showing an extended seta platform in a tract of the invention.

FIG. 10 is a front view of a field pack showing a tract for a seat platform, according to an embodiment of the invention. The seat assembly 600 of FIG. 10 includes the seat 610 and the seat tract 620 along which the seat 610 is configured to move up and down on. The seat 610 may be locked to the seat tract 620 according to an embodiment of the invention. The seat legs 630 may be extended from the seat 610 and locked in place using a lock assembly 640. In one embodiment of the invention, the lock assembly 640 prevents the continued pivoting or up and down movement of the seat 610 in the seat tract 620. In an embodiment of the invention, the height of each of the legs 630 may be independently adjusted to allow the seat 610 to be stabilized on uneven ground. The rear of the seat 610 is attached and pivots at the seat pivot 650 along the seat tract 620 allowing the seat 610 slide up and down the seat tract and to be locked into place at the desired position along the seat tract 620.

FIG. 11 is a three-dimensional view of a field pack showing an extended seat platform in a tract of the invention. A seat canvas 660 may comprise, as represented herein, a woven material or strappings to support a user when seated. A lock mechanism 670 is provided to lock the legs 630 into place preventing their further movement about the seat 610. The seat 610 may additionally be configured with locking tabs to lock the seat 610 into place in its recessed position in the field pack. In another embodiment of the invention, the lock assembly 640 may be configured to lock the seat 610 into place in its recessed position in the field pack.

Figure 12:
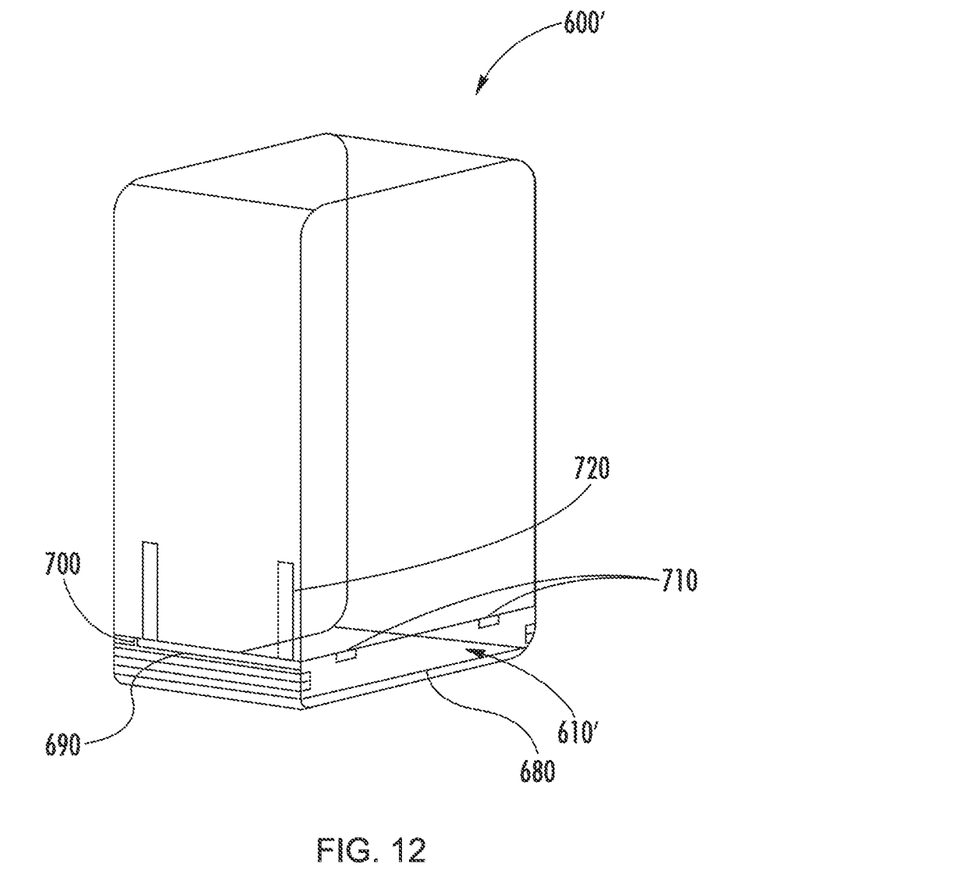
FIG. 12 is a three-dimensional view of a field pack showing a recessed set platform, according to another embodiment of the invention.

FIG. 12 is a three-dimensional view of a field pack showing a recessed seat platform, according to another embodiment of the invention. The alternative embodiment of the seat assembly 600' illustrated in FIG. 12 includes an alternative embodiment of a seat 610', which differs from the seat 610 shown in the exemplary embodiment of FIGS. 10 & 11. The seat 610' in the exemplary embodiment of the invention illustrated in FIG. 12 is enclosed in a seat compartment 680 when not in use. The seat 610' is removed from the seat compartment 680 by riding a seat tract 690 out of the seat compartment 680. A groove or slide indention 700 in the side of the seat 610' allows the seat 610' to slide out of the seat compartment 680 along the seat tract 690 and slide back into or retract into the seat compartment 680 along the seat tract 690. One or more pull handles 710 may be included to allow the seat 610' to easily be pulled from the seat compartment 680. A seat lock 720 may be configured to allow a seat 610' that has been pulled out from the seat compartment 680 to slide up into a locking position to allowing the seat 610' to be locked on to the field pack allowing the field pack to act as a secure backing for the seat 610'. In an embodiment of the invention and similar to the seat 610 disclosed in the exemplary embodiment of the invention illustrated in FIGS. 10 & 11, the seat 610' may have seat legs that are hinged to and may be pulled away from the seat 610'. The height of the legs may individually be adjusted to allow the seat 610' to be configured to sit stable on unable ground. Additionally, a lock mechanism may be provided on the legs to allow them to remain in the set position.

In certain embodiments of the invention, the hood, as earlier presented, is intended to be enclosed and recessed near the top of the field pack close to the forward front of field pack where the user's back is positioned when wearing the field pack. The hood, as earlier explained herein is attached to an internal tract or sliding rail system to allow the hood to easily be deployed by sliding up along such a tract or rail system and then to be locked into place at a desired position where the hood is intended to be used for protection and further concealment of the user. The hood is configured to be pulled forward extending above but over the head of the user. When the user's use of the hood is finished, the hood is configured to be unlocked and retracted or pushed back inward along the tract and concealed inside the field pack.

Optionally, according to an embodiment of the invention, the hood may be configured to be detachable from the tract upon which it slides allowing the hood to be used separately without remaining attached to the field pack. This configuration also allows the hood to be replaceable to allow hoods having varying camouflage configurations to better fit in with the landscape where the field pack is intended to be used. An adjustable mounting bracket may be provided allowing the hood to more easily be attached to a place remote from the field pack when the hood is detached from the field pack. For example, a user may choose to climb a tree where the hood is needed both for protection from the elements and for concealment purposes. The mounting bracket would allow the user to more easily adapt the use of the hood to this remote destination.

In an embodiment of the invention, the slide/track system of the hood may be configured to include a smaller tube that concentrically fits within a larger tube affixed to the field pack, and the smaller tube may be slid out to deploy the hood or in to retract the hood. In another embodiment of the invention, the slide/track system consists of mating rectangular interconnects with one interconnect permanently affixed to the field pack and the opposing mating interconnect configured to connect to the hood. When engaged, this tract system may include rollers allowing the hood to more easily be deployed and retracted. In both embodiments discussed herein, the systems are configured with a locking mechanism to allow the hood to remain in place once deployed and even to be locked into place when the hood is retracted back into is compartment in the field pack.

Figure 13:
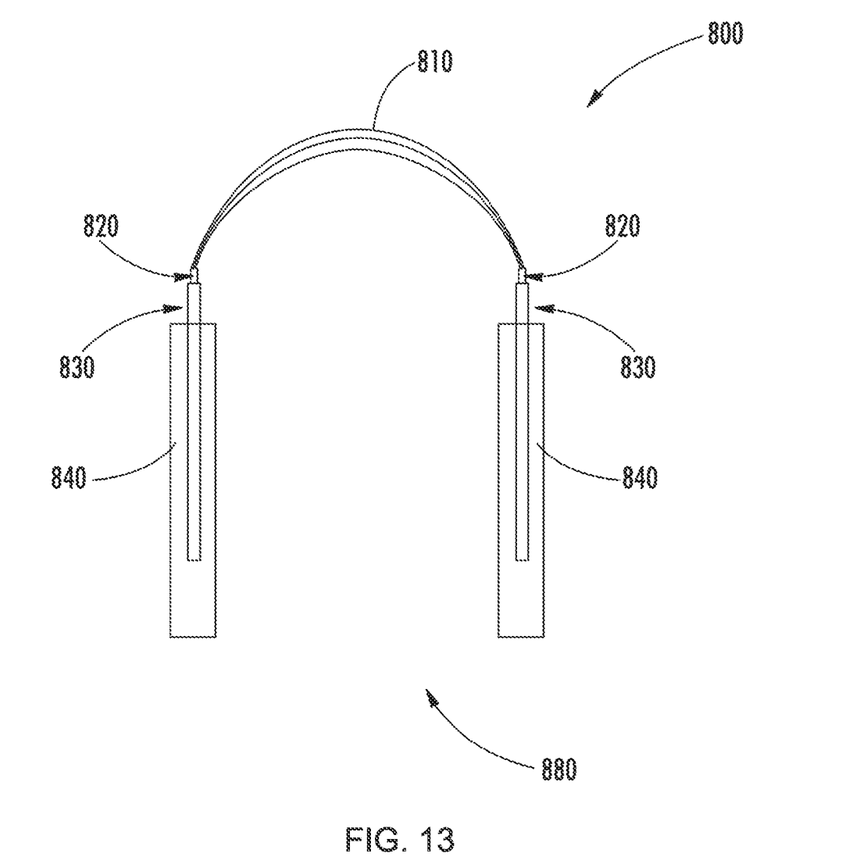
FIG. 13 is a front view of a field pack showing the hood assembly, according to another embodiment of the invention.

FIG. 13 is a front view of a field pack showing the hood assembly, according to another embodiment of the invention. The hood assembly 800 illustrated in FIG. 13 includes a hood 810. The hood 810 is interconnected to the tract system for the hood by the hood attachment 820. The hood attachment 820 is where the quickly detachable, recessable, extendible, retractable, overhead hood 810 is attached to the hood tract system. In the exemplary embodiment of FIG. 13, the hood 810 pivots from the inner tract 830 as it moves about or slides up or down along the outer tract 840. The tract system of the hood assembly 800 and the hood 810 are configured to work from a backside of the field pack 880, which is the side that rides upon the back of the user when the field pack is worn by the user. One non-limiting example of a hood that has been deployed into use is illustrated in FIG. 9.

In an embodiment of the invention, the rear of the field pack may include a carrying pouch, in particular, a waterproof carrying pouch in a preferred embodiment of the invention. In certain embodiments of the invention, the pouch is attached to the bottom of the field pack and substantially continues across the entire bottom of the field pack. The pouch may be configured to continue up the field pack with each side of the pack continuing about 8 inches, about 10 inches, about 12 inches or about 16 inches up the rear of the field pack, The pouch attached to the rear of the field back may be configured to be removable, in certain embodiments of the invention. For example, without intending to be limiting, the pouch may be snapped and/or zippered into place. The top portion of the pouch may be configured to be closed. Any closure mechanism known in the art may be used to secure at least the top portion of the pouch in a closed position. The pouch attached to the rear of the field pack may assume any geometrical shape. In non-limiting examples of the invention, the pouch may be any of square, rectangular or triangular in shape.

In an embodiment of the invention, the rear of the pack is padded to allow the field pack to be more comfortable when mounted on the back of a user. The straps to attach the field pack to the user may be configured to be adjustable to allow the pack to be securely attached to the user. In an embodiment of the invention, the straps are configured to lack any elasticity. In yet other embodiments of the invention, while the straps are somewhat rigid, they have a degree of elasticity to allow the field pack to automatically adjust to the size of the user wearing the field pack. In an embodiment of the invention, in addition to shoulder straps to attach the field pack to the user, the field pack may additionally be configured to have other body straps to comfortably and securely attach the field pack to the user. For example, the field pack may additionally include a chest strap, a belly strap, and one or more leg straps.

In an embodiment of the invention, the selection of the materials for the components of the field pack are chosen to best meet the functionality of the component. For example, the retractable, folding, extendable components of the field pack such as the blind or hood, for example, should be of the lightest yet strongest materials. In certain embodiments of the invention, the selection of the materials for the field pack is balanced against the cost effectiveness of the materials. Selection of secure closure systems must also be guided by their durability and ability to withstand the somewhat rough usage that can be anticipated in the use of the field pack. These closure systems include zippers, snaps, straps, and other fabrics put to such use. The material selection must also be such that it may withstand outdoor use including water, rain and mildew resistance. Any metals selected for the field pack must additionally be rust proof or treated to ensure they are rust proof. Alternatively, instead of selecting a metal for use such as aluminum, a carbon fiber component may be used.

Another aspect of the invention provides a method of using a field pack. The method of using the field pack includes the steps of providing a field pack having a blind assembly, deploying a left blind wing from the field pack, deploying a right blind wing from the field pack, securing the left blind wing to a surface, substantially aligning an end of the left blind wing to the right blind wing, and securing the right blind wing to the surface. The method of using the field pack provides to the user a compartment in which to remain concealed from animals in which the user has an interest in viewing or hunting.

The method of using the field pack additionally comprising providing a field pack that additionally comprises a hood assembly and deploying a hood of the hood assembly to cover a top portion of the compartment to further shield the head of the user.

The method of using the field pack additionally comprising providing a field pack that additionally comprises a seat assembly and deploying a seat of the seat assembly within the compartment.

Many modifications and other embodiments of the invention set forth herein will come to mind to one skilled in the art to which this invention pertains having the benefit of the teachings presented in the descriptions herein. It will be appreciated by those skilled in the art that changes could be made to the embodiments described herein without departing from the broad inventive concept thereof. Therefore, it is understood that this invention is not limited to the particular embodiments disclosed, but it is intended to cover modifications within the spirit and scope of the present invention as defined by the included claims.

That which is claimed:

1. A field pack comprising a bind assembly, the blind assembly having
    a tract assembly;
    a blind configured to be extended from the field pack and retracted back into the field pack using the tract assembly;
    a blind cartridge placed within a body of the field pack housing the blind, the blind cartridge comprising a roll to extend and retract the blind; and
    a support rod that supports the blind once the blind has been extended into its desired position.

2. The field pack of claim 1, wherein the tract assembly comprising an inner tract and an outer tract.

3. The field pack of claim 1, wherein the blind comprises a left blind having a left blind cartridge and a right blind having a right blind cartridge.

4. The field pack of claim 1, wherein the blind cartridge is detachable from the field pack.

5. The field pack of claim 1, additionally comprising a vest, wherein the vest is secured to the field pack using a plurality of connectors and each of the plurality of connectors having a pad to reinforce the connection to the field pack.

6. The field pack of claim 1, additionally comprising a hood assembly having
    a hood tract assembly; and
    a hood configured to be extended from the field pack using the hood tract assembly, the hood having a main pivot connected to a hood frame that becomes extended from the field pack about which the hood pivots outwardly from the field pack.

7. The field pack of claim 6, wherein the hood tract assembly having an inner hood tract and an outer hood tract.

8. The field pack of claim 6, wherein the hood is detachable from the field pack.

9. The field pack of claim 1, additionally comprising a seat assembly having
    a seat;
    a plurality of legs that fold out from the seat to support the seat; and
    a lock lever to lock each of the legs into place,
    wherein each of the legs are telescoping to allow the seat to be balanced into place through adjustment of the telescoping legs.

10. The field pack of claim 9, wherein the seat at least one of pivots outward from the field pack, slides along a tract out of and retracts back into a recessed compartment disposed inside the field pack and detaches from the field pack.

11. A field pack comprising:
    a blind assembly having
        a tract assembly,
        a blind configured to be extended from the field pack and retracted back into the field pack using the tract assembly,
        a blind cartridge placed within a body of the field pack housing the blind, the blind cartridge comprising a roll to extend and retract the blind, and
        a support rod that supports the blind once the blind has been extended into its desired position;
    a hood assembly having
        a hood tract assembly, and
        a hood configured to be extended from the field pack using the hood tract assembly, the hood having a main pivot connected to a hood frame that becomes extended from the field pack about which the hood pivots outwardly from the field pack; and
    a seat assembly having
        a seat,
        a plurality of legs that fold out from the seat to support the seat, and
        a lock lever to lock each of the legs into place.

12. The field pack of claim 11, additionally comprising a vest, wherein the vest is secured to the field pack using a plurality connectors and each of the plurality of connectors having a pad to reinforce the connection to the field pack.

13. The field pack of claim 11, wherein the tract assembly comprising an inner tract and an outer tract.

14. The field pack of claim 11, wherein the blind comprises a left blind having a left blind cartridge and a right blind having a right blind cartridge.

15. The field pack of claim 11, wherein each of the plurality of legs are telescoping to allow the seat to be balanced into place through adjustment of the legs.

16. The field pack of claim 11, wherein the seat at least one of pivots outward from the field pack and slides along a tract out of and retracts back into a recessed compartment disposed inside the field pack.

17. The field pack of claim 11, wherein any one of the blind cartridge, the hood, the seat, and any combination thereof is detachable from the field pack.

18. A method for using a field blind comprising:
    providing a field pack having a blind assembly configured to be extended from the field pack and retracted back into the field pack using a tract assembly,
    deploying a left blind wing from the field pack,
    deploying a right blind wing from the field pack,
    securing the left blind wing to a surface, substantially aligning an end of the left blind wing to the right blind wing, and
    securing the right blind wing to the surface,
    wherein the left blind wing and the right blind wing form a concealed area where a user remains concealed from animals.

19. The method of claim 18, wherein the field pack additionally comprises a hood assembly and the method of using the field pack additionally comprises deploying a hood of the hood assembly to at least one of cover a top portion of the concealed area to further shield the user and substantially cover the concealed area.

20. The method of claim 18, additionally comprising providing a field pack that comprises a seat assembly and deploying a seat of the seat assembly within the concealed area.

* * * * *